United States Patent [19]
Medwick et al.

[11] 3,785,618
[45] Jan. 15, 1974

[54] VEHICLE JACK

[76] Inventors: Joseph P. Medwick, 4938 St. Suzanne St., Pierrefonds, Quebec; Marcel Thiffault, 1176 Brault Ave., St. Vincent De Paul, Quebec, both of Canada

[22] Filed: May 30, 1972

[21] Appl. No.: 257,711

[30] Foreign Priority Application Data
Dec. 21, 1971 Canada............................ 130776

[52] U.S. Cl. ................................................ 254/94
[51] Int. Cl................................................ B66f 7/22
[58] Field of Search................................ 254/94, 86

[56] References Cited
UNITED STATES PATENTS

| | | | |
|---|---|---|---|
| 3,348,807 | 10/1967 | Rossnan................. | 254/94 |
| 810,482 | 1/1906 | Gilman .................. | 254/94 |
| 3,298,665 | 1/1967 | Sieloff..................... | 254/94 |

FOREIGN PATENTS OR APPLICATIONS

| | | | |
|---|---|---|---|
| 434,793 | 12/1933 | Great Britain......................... | 254/94 |
| 968,318 | 4/1950 | France................................... | 254/94 |

*Primary Examiner*—Othell M. Simpson
*Attorney*—Alan Swabey & Co.

[57] ABSTRACT

A vehicle jack for use with a vehicle having at least one socket mounted on the vehicle for nonrotatably receiving a shaft portion of the jack. A lifting member with a hub is rotatably mounted by its hub on the shaft portion of the jack extending out from the socket. The lifting member has a ground contacting portion extending about at least a portion of the hub and arcuately curved whereby the ground contacting surface steadily increases in radial distance from the center of the hub.

6 Claims, 5 Drawing Figures

PATENTED JAN 15 1974
3,785,618
FIG. 1
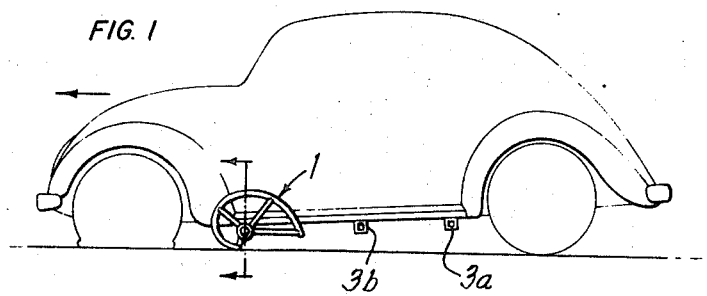
FIG. 2
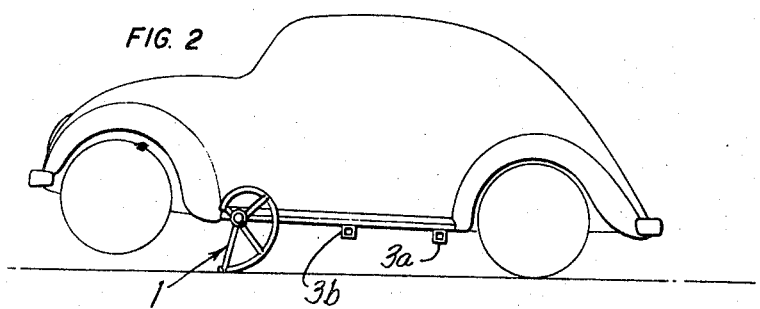
FIG. 3
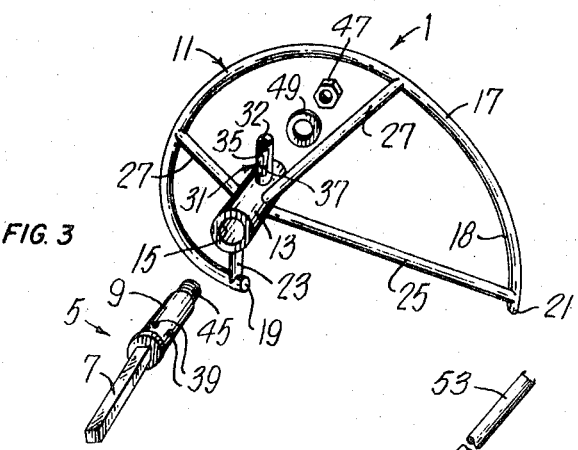
FIG. 4
FIG. 5

VEHICLE JACK

BACKGROUND OF THE INVENTION

1. Field of the Invention

This invention relates to a vehicle jack.

The invention is particularly directed toward a simple and inexpensive vehicle jack used to raise a vehicle in order, for example, to change a flat tire, which jack has very few parts, is of extremely simple and inexpensive construction, and is easy and reliable to use with little risk of damaging the vehicle, and most importantly, can be used with vehicles having low or high road clearance.

The vehicle jack is characterized by having an arcuate, ground contacting surface, which surface when rolled along the ground about an axis fixed in relation to the vehicle when the jack is connected to the vehicle, serves to lift the vehicle.

2. Description of the Prior Art

Vehicle jacks employing an arcuate surface which is rolled to lift a vehicle are known, as shown in U.S. Pat. No. 3,298,665, issued Jan. 17, 1967, K.A. SIELOFF, inventor, for example. These known jacks, however, are not altogether suitable for lifting of cars having different road clearances. Generally, the axis of rotation of these known jacks are located at one end of the arcuate surface and, for vehicles having a very low road clearance, the point of contact of the surface of the jack with the ground is not initially substantially under the point of contact of the jack with the vehicle. This makes it difficult to obtain traction to effectively employ the jack to lift the vehicle. In addition, the positioning of jacks of this type on a vehicle has been difficult.

SUMMARY OF THE INVENTION

The jack of the present invention, however, overcomes these disadvantages by providing a simple construction which could be employed with most vehicles now on the road including those vehicles having a very low road clearance. The jack is constructed to provide substantially vertical loading from the point of contact of the jack with the vehicle to its point of contact with the ground even with low clearance vehicles at all times. In addition, the mounting of the jack is simplified.

The invention is more particularly directed toward a vehicle jack for use with a vehicle having at least one shaft receiving socket mounted on the chassis of the vehicle. The jack comprises a shaft non-rotatively fitting in the socket. The shaft has a projecting hub receiving portion. The jack also includes a lifting member having a hub rotatably fitting on the hub receiving portion of the shaft. The lifting member includes an arcuate ground contacting surface extending about at least a portion of the hub, the surface increasing in radial distance from the center of the hub from a minimum radial distance at one end thereof to a maximum radial distance at the other end thereof.

More particularly, the ground contacting surface extends for at least 225° and preferably 270° about the hub with the one end of the surface preferably being located approximately 3 inches from the center of rotation of the hub and the other end of the surface being located approximately 16 inches from the center of rotation of the hub.

In a preferred embodiment, suitable locking means can be provided for non-rotatably locking the lifting member on the shaft after the lifting member has been rotated on the shaft to raise the vehicle.

BRIEF DESCRIPTION OF THE DRAWINGS

The invention will now be described in detail having reference to the accompanying drawings, wherein:

FIG. 1 illustrates the jack employed in an initial position prior to lifting a vehicle;

FIG. 2 illustrates the jack in a final position after lifting the vehicle;

FIG. 3 is a schematic view of the jack;

FIG. 4 is a cross-sectional view taken along the line 4—4 of FIG. 1; and

FIG. 5 is a schematic view of a modification of the jack.

DESCRIPTION OF THE PREFERRED EMBODIMENTS

The jack 1 is employed for use with a vehicle having one or more sockets 3 attached to each side of the chassis of the vehicle. These identical sockets 3 can comprise relatively short tubular members having a length of 6 to 12 inches welded or otherwise attached to the bottom pan or the main side frame members of the chassis of a vehicle in a position to carry the weight of the vehicle. Preferably, sockets 3a are provided adjacent the wheels for lifting the corners of the vehicle, and additional sockets 3b could be provided intermediate the wheels, as shown in FIG. 1, for lifting one side of the vehicle. The sockets are mounted to extend in a direction substantially perpendicular to the sides of the vehicle and mounted adjacent the sides of the vehicle so as to be easily accessible. The sockets can be circular or rectangular in cross-section.

The jack 1 comprises a shaft 5 which is adapted to be non-rotatably inserted into any one of the sockets. The shaft 5 has one portion 7 thereon which extends into any socket and non-rotatably cooperates therewith. If the socket 3 is of rectangular cross-section, as shown in FIG. 1, then this portion 7 of the shaft 5 is rectangular in section so as to telescopically fit into the socket. If the socket, on the other hand, is cylindrical, then the portion 7 of the shaft is cylindrical as well, and a pin or other detachable means is provided to non-rotatably lock the shaft in the socket.

The opposite end 9 of the shaft has a bearing surface for receiving the lifting member 11 of the jack. Preferably, the axis of the bearing surface portion 9 of the shaft extends at a slight angle relative to the axis of the socket inserting portion 7 of the shaft. This angle $\alpha$ can be between 5° and 10°. The reason for this angulation is that when a flat occurs, the vehicle tilts to the side of the flat. In order to have the jack extend substantially vertically when the car is in a raised position, it is necessary to compensate for the tilt.

The lifting member 11 includes a hub 13 having a central bore 15 sized to slip onto the bearing portion 9 of the shaft. A suitable thrust bearing (not shown) may be carried by the hub or the shaft so as to take any side thrust load as the vehicle is raised. The lifting member also includes a ground contacting surface 17 extending about a major portion of the hub. This surface can be provided by a steel rod 18 as shown, or a plate, bent in an arcuate shape. The rod 18 is formed to have the surface 17 increase in radial distance from one end 19 thereof relative to the axis of rotation of the hub to the other end 21 thereof. The rod 18 is joined to the hub 13 by spokes 23, 25 at or adjacent both ends 19, 21. Rod 18 is also joined to the hub by intermediate spokes 27 to provide a rigid structure sized to support the weight of the vehicle. The entire raising member can be made of any suitable material capable of bearing the weight of the vehicle to be lifted.

The arcuate surface 17 at the one end 19 is located a minimum radial distance of approximately 3 inches from the center of rotation of the hub, and the other end 21 of the surface is radially located approximately 16 inches from the center of rotation of the hub. The surface preferably increases uniformly in radial distance from the hub from one end to the other. In addition, the surface 17 extends for at least 225° and preferably 270° about the hub.

The lifting means and shaft have cooperating locking means 31 which, when the lifting means has raised a vehicle to a desired position, will lock the lifting means on the shaft in the raised position so as to prevent the vehicle from dropping down. The locking means 31, in one embodiment, can comprise a pin 31 mounted in a radial tube 32 extending from a bore 33 in the hub, as more clearly shown in FIG. 4. The pin 31 is mounted in the tube and bore and is normally biased toward the center of the hub by a spring 33. A finger 35 is provided on the pin and extends through a bayonet slot 37 in the wall of the tube. The bearing surface portion 9 of the shaft is provided with a plurality of radial holes 39 about its circumference to receive the pin. Once the vehicle has been raised to its desired height, the spring loaded pin 31 is rotated by finger 35 projecting through slot 37, thereby permitting the pin to lock in place in the next hole 39 presented thereto upon continued rotation of the lifting means.

To operate the jack, the end 7 of shaft 5 is inserted in the proper angular position in a socket 3, as shown in FIG. 4, so that bearing surface 9 extends down toward the ground at a greater angle than end 7. Shaft 5 is located axially by a shoulder 41 at the junction of shaft portions 7, 9. The lifting member is then mounted on the projecting end 9 of the shaft by hub 13 with the end 19 of the ground contacting surface 17 of the jack located radially nearest to the hub being located substantially under the center line of the axis of the shaft 5, as shown in FIG. 1. The lifting means can then if necessary, be manually rotated counterclockwise from the position shown in FIG. 1 to a position where it contacts the ground. The lifting member is positioned axially by providing a shoulder 43 on the shaft against which the hub 13 abuts. The free end of the bearing portion 9 is threaded, as shown at 45, and a nut 47 and washer 49 maintain the lifting member on the shaft. Once the lifting means has been rotated until it contacts the ground, the vehicle can then be driven forward in order to continue rotation of the lifting means on the shaft. The surface 17, continually increasing in radial distance from the hub, "unwinds" and lifts the vehicle. It will be noted that at all times the weight of the vehicle, supported by the jack, is directly over the point where the jack contacts the ground as it rolls about shaft 5. Once the vehicle has been raised to the required height, the locking means 31 is actuated to lock the lifting member to the shaft through a slight additional rotation.

While the shaft 5 and lifting member 11 have been described as being separate items, they could be combined into one item with the shaft permanently rotatably mounted within the hub.

In an alternative embodiment as shown in FIG. 5, one end 51 of the hub 13 extending outwardly from the vehicle can be formed to have a hexagon head. A telescoping handle 53 with sufficient rigidity in its extended position can be provided so that if the car cannot be driven to roll the jack, as for example, due to lack of traction, the handle 53 having a hexagon receiving head 55 at the end thereof can be inserted on the hexagon end 51 of the hub and the handle can be rotated so as to rotate the jack, and raise the car.

We claim:

1. A vehicle jack for use with a vehicle having at least one socket mounted at the bottom and side thereof, the jack comprising a lifting member, a hub on the lifting member, a shaft having a first end and a second end, the first end fitting non-rotatably in said socket, the second end engaging means comprising a bearing surface, a bore in the hub to rotatably receive the means comprising the bearing surface, a ground contacting surface of the lifting member extending about at least a portion of the hub, said ground contacting surface being arcuately curved in order to steadily increase in radial distance from the center of the hub from one end of the surface to the other end thereof, wherein the axis of the bearing surface means extends at an angle of between 5° and 10° to the axis of the socket fitting end of the shaft.

2. A vehicle jack as claimed in claim 1, wherein the surface extends for at least 225° about the periphery of the hub.

3. A car jack as claimed in claim 1 including cooperating means on the bearing surface of the shaft and the lifting member for releasably locking the lifting member relative to the hub in at least one position.

4. A car jack as claimed in claim 2, wherein the ground contacting surface at said one end is located a radial distance of at least 3 inches from the hub.

5. A car jack as claimed in claim 1, wherein the socket member comprises a hollow, rectangular tube and said portion of the shaft member insertable into the socket is of rectangular cross-section to provide the means non-rotatably locking the shaft in the socket.

6. A jack as claimed in claim 1, including a lever handle, and cooperating fitting means on one end of the handle and the lifting member, whereby the lifting member can be manually rotated about the shaft.

* * * * *